United States Patent [19]

Rossi et al.

[11] Patent Number: 4,925,608
[45] Date of Patent: May 15, 1990

[54] JOINING OF SIC PARTS BY POLISHING AND HIPPING

[75] Inventors: Guilio A. Rossi, Shrewsbury, Mass.; Paul J. Pelletier, Thompson, Conn.

[73] Assignee: Norton Company, Worcester, Mass.

[21] Appl. No.: 249,791

[22] Filed: Sep. 27, 1988

[51] Int. Cl.$^5$ .............................................. C04B 35/56
[52] U.S. Cl. ...................................... 264/60; 264/67; 264/332; 428/698
[58] Field of Search ........................... 264/60, 67, 332

[56] References Cited

U.S. PATENT DOCUMENTS

| | | | |
|---|---|---|---|
| 4,487,644 | 12/1984 | Gupta et al. | 156/89 |
| 4,514,240 | 4/1985 | Heraud | 156/89 |
| 4,526,649 | 7/1985 | Gupta et al. | 156/629 |
| 4,579,703 | 4/1986 | Adlerborn | 264/60 |

FOREIGN PATENT DOCUMENTS 209672  1/1987  European Pat. Off. .

OTHER PUBLICATIONS

Feasibility Study of the Welding of SiC—Thomas J. Moore, NASA—Lewis Res. Ctr., Cleve., Ohio Comm. of the Am. Ceramic Society C-151-153 Jun./1985.
Welding and Brazing Silicon Carbide, Thomas J. Moore, Lewis Research Center Cleve., Ohio, MASA Tech Briefs, Jul./Aug. 1986, pp. 118-119.

Primary Examiner—James Derrington
Attorney, Agent, or Firm—Arthur A. Loiselle, Jr.

[57] ABSTRACT

A method of joining two pre-sintered pieces of silicon carbide is disclosed. It entails polishing the surfaces to be joined to a mirror-finish, fitting the polished surfaces together to form a composite structure, and then subjecting the composite structure to hot isostatic pressing under conditions which are sufficient to form a joint which is essentially indistinguishable from the original silicon carbide pieces.

16 Claims, 1 Drawing Sheet

JOINING OF SIC PARTS BY POLISHING AND HIPPING

This invention resulted from the performance of United States ORNL/DOE Subcontract No. 86-XSB-045C.

TECHNICAL FIELD

This invention relates to a method of joining beta-silicon carbide (SiC) pieces to form more complex shapes, and more particularly to the joining thereof in the substantial absence of any interlayer or other adhesive. It further relates to a silicon carbide composite structure having a tensile strength of at least 20,000 psi at 1,530 C.

BACKGROUND AND INFORMATION DISCLOSURE STATEMENT

The following publications are representative of the most relevant prior art known to Applicants at the time of the filing of this application.

| United States Patents | | |
|---|---|---|
| 4,487,644 | December 11, 1984 | Gupta et al. (I) |
| 4,514,240 | April 30, 1985 | Heraud |
| 4,526,649 | July 2, 1985 | Gupta et al. (II) |
| Other Publications | | |
| EP0209672 | January 28, 1987 | Gyarmati et al. |
| T. J. Moore, | J. Am. Ceram. Soc., 68(6) | C-151-C-153 (1985) |
| NASA Tech. Briefs, | July/August 1986, | pp. 118-119 |

Silicon carbide molded bodies having complex shapes are in practice made of several parts which have then been joined together. However, in view of the relatively inert nature of silicon carbide, there has been considerable difficulty in effecting the joining operation, particularly when the end use of the joined silicon carbide pieces will be at temperatures of greater than 1,500 degrees C. Accordingly, the art is replete with the use of various adhesives/glues to be used to join two silicon carbide pieces. Examples of these include various metal alloys, molten silicon, platinum pastes, molybdenum borides, silicon carbide slips, and the like. However, all of these prior art joining methods entail placing some component between the pieces which means that the resultant joint will inherently be weaker than the SiC pieces and thus the failure point in the finished part. Moreover, none of the prior joining methods has been sufficient to produce a component beta-silicon carbide part which has a tensile strength of 20,000 psi at 1530 C.

The joining of alpha-silicon carbide parts in the absence of any adhesive/glue interlayer has been attempted in the past. This joining is generally referred to as welding. Moore discloses polishing commercial sintered alpha-SiC blocks (theoretical density 98%) with a 320-grit diamond wheel and then attempting joining be hot isostatic pressing at 1950 C. and 138 MPa for 2 hours. When no interlayer was present "absolutely no welding took place", Moore goes on to explain that this unsuccessful result was "not unexpected in view of the fact that SiC powder is known to be difficult to sinter without sintering aids."

NASA Tech. Briefs confirms that under hot isostatic pressing (HIP) conditions of 1950 C. at 20,000 psi for 2 hours with no plastic deformation, SiC could not be welded at all.

U.S. Pat. No. 4,487,644 (Gupta I) discloses polishing silicon carbide surfaces to 1 um, incorporating at least 8 % excess silicon on at least one of the surfaces to be joined, and then heating of the fitted-together bodies in an inert atmosphere under pressure at a temperature of between 1,500 and 1,800 C. and with a force on the bonding surfaces of 1 to 10 kg/cm$^2$ (14.2 to 142 psi).

The difficulty of joining silicon carbide pieces is such that, two years after Gupta I, Gupta II (U.S. Pat. No. 4,526,649) teaches that the way to do so is to first roughen the silicon carbide surfaces to be joined to a depth of about 100 to 500 um by removal of excess silicon, if present, and then to fill the space with a cokable resin and add liquid silicon to react with the resin at elevated temperatures but with no applied force.

EPO No. 209,672 discloses polishing the surfaces of sintered or hot pressed silicon carbide bodies to be joined, then interposing a maximum 1 um thick coating of at least one metal carbide and/or metal silicide-forming element, and then welding in an inert or reducing atmosphere at elevated temperature under a pressure of 150 to 15,000 psi. The thin coating may be applied by vapour coating or sputtering.

U.S. Pat. No. 4,514,240 discloses the use of an interlayer between two unsintered (porous) silicon carbide pieces, but then goes on to advocate the use of chemical vapor deposition both in the porous bond and in the bonded porous silicon carbide parts to complete the bonding operation.

Accordingly, there is a need for a method of joining beta-silicon carbide pieces with such integrity that the joint is at least as strong as the underlying silicon carbide at temperatures in excess of 1,500 C. In light of this strength at temperature requirement for numerous future silicon carbide applications, there is need for a joining method which will produce a joint which, under scanning electron microscopic examination, is indistinguishable from the pieces being joined. The use of silicon carbide at such elevated temperatures has been severely limited due to the lack of such a joining method. Accordingly, it is an object of the present invention to satisfy these needs and thereby expand the opportunities for using silicon carbide in more complex shapes.

SUMMARY OF THE INVENTION

This invention provides a method of forming an improved joint between two pre-densified predominantly beta-silicon carbide surfaces by (i) polishing the surfaces to be joined to form mirror-like surfaces, (ii) placing the surfaces in contact with each other, and (iii) subjecting them to hot isostatic pressing (HIP) conditions sufficient to form a joint which is indistinguishable from the original silicon carbide parts. The HIPping promotes interdiffusion of the silicon carbide between the two parts being joined.

DESCRIPTION OF THE PREFERRED EMBODIMENTS

Figure 1:
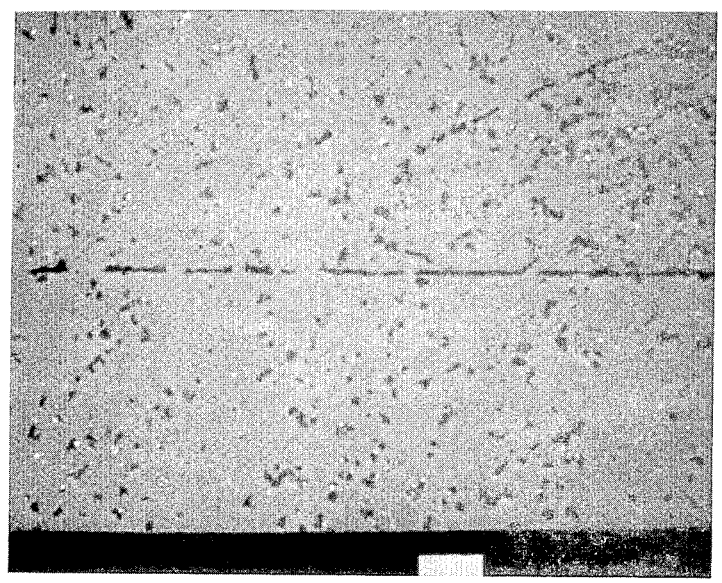
FIG. 1 is a SEM micrograph of a joint produced by polishing and pressureless sintering, i.e. without the HIPping operation required by the present invention.

The present invention enables the joining of two beta-silicon carbide pieces which have been densified prior to commencing the joining operation. By this is meant that the pieces have been subjected to some type of sintering operation whereby the density of a silicon carbide body has been increased in density from that of a green body, i.e. about 50 to 60%, to at least about 85% of theoretical density. Preferably, the density will be at least 90% of theoretical, and most preferably 95% or more.

The silicon carbide to be joined has a predominently beta crystal structure, though some of the beta may have been converted to alpha during the prior sintering operation.

The surfaces of the densified silicon carbide pieces to be joined are then polished to form mirror-like finishes. This is conveniently performed by grinding and polishing with diamond pastes. The polishing step is critical to achieving the superior joints of the invention and the surfaces should be as smooth as possible, i.e. to within about 60 nanometers, preferably to within about 30 nanometers, and most preferably to within about 15 nanometers, as determined by the center line average method using a diamond-tipped stylus. Depending upon the initial roughness of the surfaces, this will be accomplished by polishing with increasingly finer diamond pastes until the final polishing stages are performed using diamonds of grain size of less than 2 microns, preferably 1 micron or less. Further details on the polishing operation may be had from the literature as this is a conventional operation for silicon carbide parts. The polishing should, however, be conducted in such a manner as to minimize any potential grain pullout or other deviations from smoothness on the surface. While the final surfaces do not have to be perfectly flat, they must have essentially identical curvatures so that they will mate as closely as possible.

The polished joining surfaces are then cleaned to remove any dust particles, grease, and any other contaminants. This may be performed by using any conventional solvents, as is known in the art. It has also been found beneficial at times to deoxidize the polished surfaces by a separate treatment with such as hydrofluoric acid.

The polished surfaces are next friction fitted together. When the surfaces have been polished and cleaned sufficiently, there will generally be a sufficient attraction between them to hold them together against the pull of gravity. This "bond" is especially evident when the pieces being joined are of modest size. This initial bond is not strong enough to withstand significant mechanical stresses, but when no such bond is observed it has generally been found to indicate that the surfaces have not been polished or cleaned sufficiently to enable the preparation of the uniform high temperature joint of this invention.

If it is desired to strengthen this initial bond to improve the handling of the composite structure, this may be accomplished by subjecting the structure to sintering conditions by firing in an inert atmosphere. An example of such conditions is about 2,100 C. for about 1 hour in an inert, i.e. argon, atmosphere. This sintering/heating is generally conducted pressurelessly. This step, if performed, may result in a relatively weak joint which may be adequate for some low temperature applications of silicon carbide but is most definitely not adequate for high temperature applications.

The joining of the two beta-silicon carbide pieces is then completed by subjecting the composite structure to hot isostatic pressing (HIPping) under such conditions as will cause the joint to be essentially indistinguishable from the pieces being joined as determined by a scanning electron microscope. Suitable such conditions include temperatures of greater than about 1700 C., pressures greater than about 22,000 psi, and a time of at least 30 minutes at temperature and pressure. Preferable conditions are at least 1800 C. and at least 25,000 psi for at least 45 minutes. Most preferably, the conditions are at least about 1900 C. and at least about 30,000 psi for about one hour.

The HIPping must be performed in such a manner that no gas or other species present during the operation is allowed to enter into the joint. This may be accomplished by any of several methods. For instance, the HIPping may be conducted by enclosing the composite structure in a tantalum can (as disclosed in such as U.S. Pat. No. 3,932,178) and evacuating the can prior to increasing the temperature and pressure. Alternatively, the structure may by enclosed within a glass or a material forming glass upon heating (the "ASEA" process disclosed in such as U.S. Pat. Nos. 4,081,272, 4,112,143, 4,256,688, 4,446.100, and 4,455,275). For the ASEA process, a barrier layer, e.g. silicon nitride or boron nitride powder, should be deposited on the joint before HIPping to prevent any possible glass infiltration into the joint.

Another method of protecting the initial bond from the gaseous species present during HIPping is to encapsulate at least the joint with a sealed layer of silicon carbide. The encapsulation may be performed by depositing a silicon carbide around the joint using a chemical vapor deposition (CVD) process. CVD, which can be performed according to the different known ways normally used, consists in placing the composite structure in contact with a gas containing one or more chemical species containing the elements to be deposited and generally one or more chemical species which could be used as reagents, carriers, or diluents. In certain conditions of temperature, pressure, and flow gate, the transfer of gases by diffusion, and their decomposition with release of the elements to be deposited on the joint to be protected is possible without their entry into the joint itself. Reference may be had to French Patent Nos. 2,189,207 and 2,041,888 which describe the chemical vapor deposition of respectively carbon and refractory materials other than carbon. If the CVD coating is impervious, i.e. it does not contain any pinholes, then the pressureless sintering step prior to HIPping may be omitted and the HIPping conducted simply with a gas and without any other means to protect the joint.

The beta-silicon carbide parts joined according to the present invention can be machined to their final shape without this raising any particular problems.

The following specific examples are provided by way of information and not limitation. They demonstrate the preparation and testing of the joints of this invention. All parts and percents are by weight unless otherwise specified.

EXAMPLE I

Two 12 mm diameter cylinders, one 12 mm and one 6 mm in height, were made by conventional techniques from IBIDEN BETARUNDUM ultrafine beta-silicon carbide powder, utilizing 1 percent boron and 2 percent carbon as sintering aids. The cylinders were die pressed at 69 MPa and then fired in an argon atmosphere, at about normal ambient pressure for one hour at 2100° C. to cause sintering. The densities were 95% of theoretical. One of the flat faces of each cylinder was polished with pastes of 1 micron size diamonds to a surface smoothness of about 6.3 nanometers (nm) (as determined by the center line average method using a diamond-tipped stylus), producing a reflective, mirror-like surface. After careful cleaning the two polished faces were fitted together and they held together. To improve the initial bond and the ability to handle the composite, it was fired in an argon atmosphere for 1 hour at 2100° C. The example up to this point was then repeated twice with two more sets of pieces of silicon carbide. Two of the samples thus prepared were broken in shear on an Instron tester; both broke partially at the joint, and the calculated shear strength values were 15 and 23 MPa respectively. The third sample was sliced with a diamond blade perpendicular to the joint surface and polished with conventional diamond pastes for microscopic examination. FIG. 1 shows the scanning electron microscope (SEM) image of this sample. The joint line is clearly visible and has many dark spots, as does the remainder of the sample. Many of the dark spots are believed to be artifacts of the polishing process, i.e. areas where grains have pulled out during polishing. However, some of them, including some of those in the joint area, may represent actual porosity in the sample. The joint between the silicon carbide pieces is far from perfect, as indicated by the SEM and the relatively low shear values as compared with the best monolithic silicon carbide, but the joint is much better than before heating and in fact may be usable under certain limited circumstances.

EXAMPLE II

In this example, all the joining steps of Example I were repeated, and then the joined pieces were subjected to glass encapsulated hot isostatic pressing (HIPping) according to the ASEA technology at 1900° C. for one hour under 207 MPa (30,000 psi) pressure of argon. Three replicates were made, as in Example I.

Figure 2:
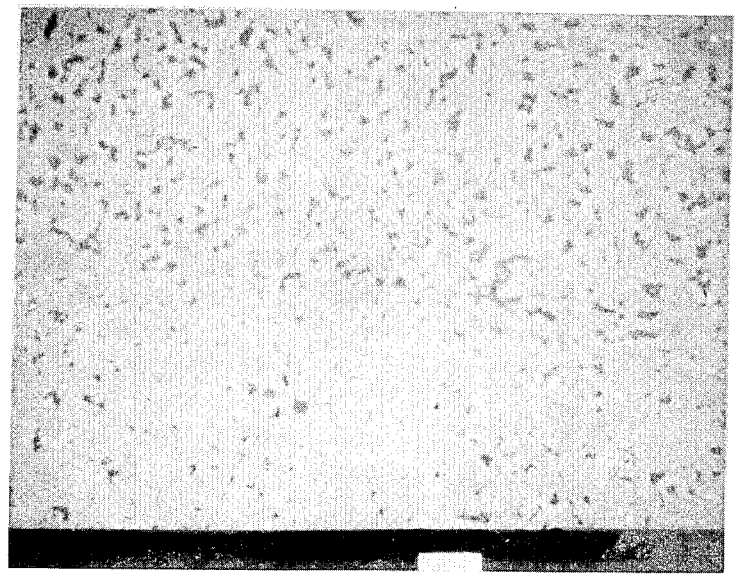
FIG. 2 is a SEM micrograph of a joint produced by the present invention.

After HIPping, the material had a density in excess of 99% of theorectical, showing that some porosity originally present in the sintered pieces had been eliminated by the HIP. Two of the HIPped samples were tested in shear in an Instron as in Example I. The HIPped samples had shear strengths of 110 and 101 MPa, and neither sample broke at the joint. The third replicate was sliced and polished for SEM examination as in Example I, with the result shown in FIG. 2. The joint line is difficult to distinguish in this sample, and, if anything, the joint area appears to have less porosity than the remainder of the material.

COMPARATIVE EXAMPLE A

Two die pressed SiC cylinders with the same dimensions as in Example I were partially sintered at 1800° C. in argon to achieve adequate green strength. The densities were about 57% of theoretical. One flat surface of each cylinder was ground with a 100 grit grinding wheel and then cleaned as per Example I. The two ground surfaces were then friction fitted together and had enough mutual adhesion to sit without outside support during a firing at 2100° C. in argon for one hour. However, only a very weak bond that could easily be separated by hand was obtained after firing. This example illustrates that if the parts being joined have the low porosity of a green body, then this method fails to produce a good joint.

COMPARATIVE EXAMPLE B

The procedure of Example II was repeated except that the surfaces were ground with only 320-grit diamonds and HIPping was performed at 1950 C. and 138 MPa (20,000 psi) for 2 hours. Absolutely no joining took place. This demonstrates that the use of both insufficient polishing and insufficient HIPping pressure will not produce a strong joint.

EXAMPLE III

The procedure of Example II is repeated except that the densities of the initial cylinders is only 88% of theoretical. A strong uniform joint results.

EXAMPLE IV

The procedure of Example II is repeated except that prior to HIPping the joint is sealed with silicon carbide which was deposited by a conventional chemical vapor deposition process by Midland Materials Research of Midland, Michigan. The sample is then subjected to either glass encapsulated HIPping at 1900 C. and 30,000 psi for one hour, or conventional HIPping without the glass at the same conditions. A strong uniform joint is again produced in both cases.

EXAMPLE V

The procedure of Example II is repeated except that the cylinders are replaced by tensile specimens which produce a joined product having the shape and size necessary to conduct tensile strength tests in accordance with ASTM Test E.8M-88. In a tensile test at 1,530 C., the sample exhibits a tensile strengh of greater than 20,000 psi and the sample does not break at the joint.

What is claimed is:

1. A method of joining two pre-densified predominantly beta-silicon carbide pieces which comprises (i) polishing a surface of each silicon carbide piece to a mirror-like condition, (ii) fitting the polished surfaces to each other to form a partially bonded composite structure, and (iii) subjecting the structure to hot isostatic pressing conditions at a pressure of at least about 22,000 psi which preclude the entrance of any species into the joint and which are sufficient to form a uniform joint which is essentially indistinguishable from the original silicon carbide pieces.

2. The method of claim 1 wherein the silicon carbide pieces have an initial density of at least about 85% of theoretical.

3. The method of claim 1 wherein the silicon carbide pieces have an initial density of at least about 90% of theoretical.

4. The method of claim 1 wherein the silicon carbide pieces have an initial density of about 95% or more of theoretical.

5. The method of claim 1 wherein the polished surfaces are smooth to within 60 nanometers.

6. The method of claim 1 wherein the polished surfaces are smooth to within 30 nanometers.

7. The method of claim 1 wherein the hot isostatic pressing conditions comprise placing the composite structure in a tantalum can.

8. The method of claim 1 wherein the hot isostatic pressing conditions comprise placing the composite structure in a glass or a material forming a glass upon heating.

9. The method of claim 1 wherein, prior to the hot isostatic pressing, the joint is encapsulated with a sealed layer of silicon carbide.

10. The method of claim 9 wherein the sealed silicon carbide layer is formed by chemical vapor deposition.

11. The method of claim wherein the hot isostatic pressing conditions comprise a temperature of at least about 1,700 C. and a pressure of at least about 22,000 psi, for a time of at least about 30 minutes at temperature.

12. The method of claim 1 wherein the hot isostatic pressing conditions comprise at least about 1,800 C. and at least about 25,000 psi, for at least about 45 minutes at temperature.

13. The method of claim 1 wherein the hot isostatic pressing conditions comprise at least about 1,900 C. and at least about 30,000 psi, for about one hour at temperature.

14. The method of claim 1 wherein after fitting the pieces together and before the hot isostatic pressing the composite structure is subjected to a heating operation to improve the initial partial bond.

15. The method of claim 14 wherein the heating is at about 2,100 C. for about 1 hour in an inert atmosphere.

16. The method of claim 1 wherein the silicon carbide pieces are each prepared from beta-silicon carbide and at least some of the beta form has been converted to the alpha form during pre-densification.

* * * * *